(12) United States Patent
Iizuka et al.

(10) Patent No.: US 8,419,586 B2
(45) Date of Patent: Apr. 16, 2013

(54) AUTOMATIC TRANSMISSION

(75) Inventors: Kohei Iizuka, Wako (JP); Noriaki Saitoh, Wako (JP); Soichi Sugino, Wako (JP); Jorg Muller, Chemnitz (DE); Rico Resch, Wilsdruff (DE); Mirko Leesch, Thum (DE)

(73) Assignee: Honda Motor Co., Ltd., Tokyo (JP)

( * ) Notice: Subject to any disclaimer, the term of this patent is extended or adjusted under 35 U.S.C. 154(b) by 314 days.

(21) Appl. No.: 12/771,112

(22) Filed: Apr. 30, 2010

(65) Prior Publication Data

US 2010/0298086 A1 Nov. 25, 2010

(30) Foreign Application Priority Data

May 22, 2009 (JP) ................................. 2009-123832
Jun. 15, 2009 (JP) ................................. 2009-142142

(51) Int. Cl.
*F16H 3/62* (2006.01)
(52) U.S. Cl.
USPC .......................................... 475/276; 475/281
(58) Field of Classification Search .................. 475/275, 475/276, 279, 280, 281, 283, 291
See application file for complete search history.

(56) References Cited

U.S. PATENT DOCUMENTS

| 3,977,272 | A | * | 8/1976 | Neumann | 475/281 |
|---|---|---|---|---|---|
| 7,524,257 | B2 | | 4/2009 | Tabata et al. | |
| 2005/0239593 | A1 | * | 10/2005 | Gumpoltsberger | 475/275 |
| 2007/0184932 | A1 | | 8/2007 | Tabata et al. | |
| 2007/0259753 | A1 | * | 11/2007 | Diosi et al. | 475/276 |
| 2010/0179016 | A1 | * | 7/2010 | Hart et al. | 475/275 |
| 2010/0179019 | A1 | * | 7/2010 | Phillips et al. | 475/276 |

FOREIGN PATENT DOCUMENTS

JP 2005-273768 A 10/2005

* cited by examiner

*Primary Examiner* — Justin Holmes
*Assistant Examiner* — Stacey Fluhart
(74) *Attorney, Agent, or Firm* — Westerman, Hattori, Daniels & Adrian, LLP

(57) ABSTRACT

Provided is an automatic transmission capable of reducing friction loss. The automatic transmission is provided with an input shaft (2) coupled with a sun gear (Sa), an output member (3), a first to third planetary gear mechanisms (4, 5, 6), a first engagement mechanism (C1) coupling the input shaft (2) with a ring gear (Rc) releasably, a second engagement mechanism (C2) coupling a carrier (Ca) with a carrier (Cc) releasably, a third engagement mechanism (C3) coupling the carrier (Ca) with a second coupling body (Rb-Sc) releasably, a fourth engagement mechanism (B1) fixing a first coupling body (Ra-Cb) to a transmission case (1) releasably, a fifth engagement mechanism (B2) fixing a sun gear (Sb) to the transmission case (1) releasably, and a sixth engagement mechanism (B3) fixing the ring gear (Rc) to the transmission case (1) releasably.

4 Claims, 9 Drawing Sheets

FIG.3

| | C1 | C2 | C3 | B1 | B2 | B3 | F1 | GEAR RATIO | COMMON RATIO |
|---|---|---|---|---|---|---|---|---|---|
| Rev | | | ○ | | ○ | ○ | | 2.681 | 61.2% |
| 1 | | ○ | | | ○ | (○) | ○ | 4.384 | 1.644 |
| 2 | | ○ | | ○ | ○ | | | 2.666 | 1.641 |
| 3 | | ○ | ○ | | ○ | | | 1.625 | 1.393 |
| 4 | ○ | ○ | | | ○ | | | 1.166 | 1.166 |
| 5 | ○ | ○ | ○ | | | | | 1.000 | 1.233 |
| 6 | ○ | | ○ | | ○ | | | 0.811 | 1.118 |
| 7 | ○ | | ○ | ○ | | | | 0.725 | 1.165 |
| 8 | ○ | | | ○ | ○ | | | 0.623 | 7.041 |

FIG.8

|   | C1 | C2 | C3 | B1 | B2 | B3 | F1 | GEAR RATIO | COMMON RATIO |
|---|----|----|----|----|----|----|----|------------|--------------|
| Rev |   |   | ○ |   | ○ | ○ |   | 2.707 | 61.5% |
| 1 |   | ○ |   |   | ○ | (○) | ○ | 4.400 | 1.651 |
| 2 |   | ○ |   | ○ | ○ |   |   | 2.666 | 1.641 |
| 3 |   | ○ | ○ |   | ○ |   |   | 1.625 | 1.394 |
| 4 | ○ | ○ |   |   | ○ |   |   | 1.166 | 1.166 |
| 5 | ○ | ○ | ○ |   |   |   |   | 1.000 | 1.231 |
| 6 | ○ |   | ○ |   | ○ |   |   | 0.812 | 1.117 |
| 7 | ○ |   | ○ | ○ |   |   |   | 0.727 | 1.164 |
| 8 | ○ |   |   | ○ | ○ |   |   | 0.625 | 7.042 |

AUTOMATIC TRANSMISSION

BACKGROUND OF THE INVENTION

1. Field of the Invention

The present invention relates to an automatic transmission which changes rotations of an input shaft into multiple gear speeds transmitted to an output member via a plurality of planetary gear mechanisms disposed in a transmission case.

2. Description of the Related Art

Conventionally, there has been known an automatic transmission (for example, refer to Japanese Patent Laid-Open No. 2005-273768) which performs 8 forward gear speed changes via a first planetary gear for inputting, two planetary gears for gear change and six engagement mechanisms.

The first planetary gear in the automatic transmission disclosed in Japanese Patent Laid-Open No. 2005-273768 is of a double-pinion planetary gear mechanism comprised of a first sun gear, a first ring gear, and a first carrier pivotally supporting a pair of first pinions, which are intermeshed with each other with either one intermeshed with the first sun gear and the other one intermeshed with the first ring gear, in such a way that the pair of first pinions can rotate and revolve freely.

In the first planetary gear, the sun gear is equivalent to a fixing element fixed to a transmission case, the first carrier is equivalent to an input element coupled with an input shaft, and the first ring gear is equivalent to an output element configured to decelerate a rotation speed of the first carrier equivalent to the input element and output the decelerated rotation speed.

The two planetary gears for gear change are of a Ravigneaux planetary gear mechanism comprised of a second sun gear, a third sun gear, a second ring gear integral with a third ring gear, and a second carrier pivotally supporting a pair of second pinions, which are intermeshed with each other with either one intermeshed with the second sun gear and the second ring gear and the other one intermeshed with the third sun gear, in such a way that the pair of second pinions can rotate and revolve freely.

In the Ravigneaux planetary gear mechanism, the second sun gear is equivalent to a first rotation element, the second carrier integral with the third carrier is equivalent to a second rotation element, the second ring gear integral with the third ring gear is equivalent to a third rotation element, and the third sun gear is equivalent to a fourth rotation element in the order of distances relative to gear ratios in a velocity diagram.

The engagement mechanisms are comprised of a first engagement mechanism releasably coupling the first ring gear equivalent to the output element of the first planetary gear with the fourth rotation element composed of the third sun gear, a second engagement mechanism releasably coupling the input shaft with the second rotation element composed of the second carrier, a third engagement mechanism releasably coupling the first ring gear equivalent to the output element with the first rotation element composed of the second sun gear, a fourth engagement mechanism releasably coupling the first carrier equivalent to the input element with the first rotation element composed of the second sun gear, a fifth engagement mechanism releasably fixing the first rotation element composed of the second sun gear to the transmission case, and a sixth engagement mechanism releasably fixing the second rotation element composed of the second carrier to the transmission case.

According to the configurations mentioned above, a first gear speed is established when the first engagement mechanism and the sixth engagement mechanism are engaged; a second gear speed is established when the first engagement mechanism and the fifth engagement mechanism are engaged; a third gear speed is established when the first engagement mechanism and the third engagement mechanism are engaged; a fourth gear speed is established when the first engagement mechanism and the fourth engagement mechanism are engaged.

A fifth gear speed is established when the first engagement mechanism and the second engagement mechanism are engaged; a sixth gear speed is established when the second engagement mechanism and the fourth engagement mechanism are engaged; a seventh gear speed is established when the second engagement mechanism and the third engagement mechanism are engaged; an eighth gear speed is established when the second engagement mechanism and the fifth engagement mechanism are engaged. In addition, if the first gear speed or the eighth gear speed is excluded, it is possible to establish 7 forward gear speeds.

In the conventional transmission, the engagement mechanisms to be engaged in each gear speed are two. Thereby, the dragging among the other four freed engagement mechanisms will make friction loss become greater, deteriorating the efficiency of the transmission.

SUMMARY OF THE INVENTION

The present invention has been accomplished in view of the aforementioned problems, and it is therefore an object of the present invention to provide an automatic transmission capable of reducing friction loss.

A first aspect of the present invention provides an automatic transmission which changes rotations of an input shaft into multiple gear speeds transmitted to an output member via a plurality of planetary gear mechanisms disposed in a transmission case, wherein the plurality of planetary gear mechanisms includes three planetary gear mechanisms of a first planetary gear mechanism to a third planetary gear mechanism, three elements comprised of a sun gear, a carrier and a ring gear of the first planetary gear mechanism are set as a first element, a second element and a third element, respectively, in the order of distances relative to gear ratios in a velocity diagram, three elements comprised of a sun gear, a carrier and a ring gear of the second planetary gear mechanism are set as a fourth element, a fifth element and a sixth element, respectively, in the order of distances relative to gear ratios in the velocity diagram, three elements comprised of a sun gear, a carrier and a ring gear of the third planetary gear mechanism are set as a seventh element, an eighth element and a ninth element, respectively, in the order of distances relative to gear ratios in the velocity diagram, the first element is coupled with the input shaft, the seventh element is coupled with the output member, the third element and the fifth element are coupled to form a first coupling body, the sixth element and the ninth element are coupled to form a second coupling body, a first engagement mechanism couples the input shaft with the eighth element releasably, a second engagement mechanism couples the second element with the seventh element releasably, a third engagement mechanism couples the second element with the second coupling body releasably, a fourth engagement mechanism fixes the first coupling body to the transmission case releasably, a fifth engagement mechanism fixes the fourth element to the transmission case releasably, a sixth engagement mechanism fixes the eighth element to the transmission case releasably, and the third planetary gear mechanism is of a double-pinion planetary gear mechanism comprised of the sun gear, the ring gear, and the carrier pivotally supporting a pair of pinions, which are intermeshed with each other with either one intermeshed with the sun gear and the other one intermeshed with the ring gear, in such a way that the pair of pinions can rotate and revolve freely.

As to be made clear by an embodiment to be described hereinafter, according to the first aspect of the present invention the automatic transmission can perform 7 forward gear speed changes or even more, and in each gear speed change, three of the six engagement mechanisms from the first to the sixth engagement mechanism are engaged. Thereby, in each gear speed change, the freed engagement mechanisms are three. In comparison with the conventional transmission in which the freed engagement mechanisms are four, the friction loss caused by the freed engagement mechanisms is reduced, and consequently, the efficiency of the automatic transmission is improved.

In the first aspect of the present invention, it is preferable that the sixth engagement mechanism is a one-way clutch or a two-way clutch. According to the mentioned configuration, it is possible to better control the gear changes between the first gear speed and the second gear speed in comparison with the case where the sixth engagement mechanism is formed from a wet multi-plate clutch only.

In the first aspect of the present invention, it is preferable that the second engagement mechanism is an intermeshing mechanism. As to be made clear by an embodiment to be described hereinafter, according to the mentioned configuration, the second intermeshing mechanism which is engaged only in a range of low forward gear speeds and freed only in a range of high forward gear speeds functions as a mechanism avoiding the friction loss. Thereby, the friction loss can be further inhibited in the range of high forward gear speeds, and consequently, the efficiency of the automatic transmission is further improved.

In the first aspect of the present invention, it is preferable that the third engagement mechanism is disposed at an outer position of the second engagement mechanism in the radial direction thereof and has at least a part overlapped with the second engagement mechanism in the axial direction of the input shaft. According to the mentioned configuration, the length of the shaft of the automatic transmission can be made shorter.

A second aspect of the present invention provides an automatic transmission which changes rotations of an input shaft into multiple gear speeds transmitted to an output member via a plurality of planetary gear mechanisms disposed in a transmission case, wherein the plurality of planetary gear mechanisms includes three planetary gear mechanisms of a first planetary gear mechanism to a third planetary gear mechanism, the third planetary gear mechanism is of a single-pinion planetary gear mechanism comprised of the sun gear, the ring gear, and the carrier pivotally supporting a pinion intermeshed with the sun gear and the ring gear in such a way that the pinion can rotate and revolve freely, three elements comprised of a sun gear, a carrier and a ring gear of the first planetary gear mechanism are set as a first element, a second element and a third element, respectively, in the order of distances relative to gear ratios in a velocity diagram, three elements comprised of a sun gear, a carrier and a ring gear of the second planetary gear mechanism are set as a fourth element, a fifth element and a sixth element, respectively, in the order of distances relative to gear ratios in the velocity diagram, three elements comprised of a sun gear, a carrier and a ring gear of the third planetary gear mechanism are set as a seventh element, an eighth element and a ninth element, respectively, in the order of distances relative to gear ratios in the velocity diagram, a parallel gear is disposed to be adjacent to the parallel gear and intermeshed with the pinion of the third planetary gear mechanism, the first element is coupled with the input shaft, the seventh element is coupled with the output member, the third element and the fifth element are coupled to form a first coupling body, the sixth element and the ninth element are coupled to form a second coupling body, a first engagement mechanism couples the input shaft with the eighth element releasably, a second engagement mechanism couples the second element with the seventh element releasably, a third engagement mechanism couples the second element with the second coupling body releasably, a fourth engagement mechanism fixes the first coupling body to the transmission case releasably, a fifth engagement mechanism fixes the fourth element to the transmission case releasably, and a sixth engagement mechanism fixes the eighth element to the transmission case releasably.

As to be made clear by an embodiment to be described hereinafter, according to the second aspect of the present invention the automatic transmission can perform 7 forward gear speed changes or even more, and in each gear speed change, three of the six engagement mechanisms from the first to the sixth engagement mechanism are engaged. Thereby, in each gear speed change, the freed engagement mechanisms are three. In comparison with the conventional transmission in which the freed engagement mechanisms are four, the friction loss caused by the freed engagement mechanisms is reduced, and consequently, the efficiency of the automatic transmission is improved.

In the second aspect of the present invention, in addition to the third planetary gear mechanism, it is possible to configure the first planetary gear mechanism and the second planetary gear mechanism as a single-pinion planetary gear mechanism comprised of the sun gear, the ring gear, and the carrier pivotally supporting a pinion intermeshed with the sun gear and the ring gear in such a way that the pinion can rotate and revolve freely.

According to the mentioned configuration, by configuring all the three planetary gear mechanisms into the single-pinion planetary mechanism, in comparison with the case of the double-pinion planetary mechanism, the number of intermeshing times can be reduced, and consequently, the efficiency of the automatic transmission is improved.

In the second aspect of the present invention, similar to the first aspect, it is preferable that the sixth engagement mechanism is a one-way clutch or a two-way clutch. According to the mentioned configuration, it is possible to better control the gear changes between the first gear speed and the second gear speed in comparison with the case where the sixth engagement mechanism is formed from a wet multi-plate clutch only.

In the second aspect of the present invention, similar to the first aspect, it is preferable that the second engagement mechanism is an intermeshing mechanism. As to be made clear by an embodiment to be described hereinafter, according to the mentioned configuration, the second engagement mechanism which is engaged only in a range of low forward gear speeds and freed only in a range of high forward gear speeds functions as a mechanism avoiding the friction loss. Thereby, the friction loss can be further inhibited in the range of high forward gear speeds, and consequently, the efficiency of the automatic transmission is further improved.

In the second aspect of the present invention, when the automatic transmission is used in a FR layout vehicle, for the purpose of miniaturization, it is desired that the output member is configured to be a shaft as the output shaft, disposed coaxially with the input shaft and coupled with a propeller shaft or the like. However, for example, if the parallel gear is disposed between the fifth engagement mechanism and the sixth engagement mechanism, it is impossible to dispose the output shaft, namely the output member, coaxially with the input shaft due to the obstacle from the transmission case.

Therefore, it is necessary to use a gear as the output member, dispose a counter shaft in parallel to the input shaft, a follower gear intermeshed with the gear equivalent to the output member to the counter shaft. Thereby, the driving force is transmitted from the counter shaft to the rear wheels via the propeller shaft or the like. However, in this case, it is necessary to dispose the counter shaft therein, which makes the automatic transmission become large-sized unfavorably.

In this regarding, in the present invention, it is favorable that the fourth to the sixth engagement mechanisms are disposed closer to a driving source for driving the input shaft to rotate than to the parallel gear, and the output member is an output shaft disposed coaxially with the input shaft. According to the mentioned configuration, the output member is configured as a shaft and is disposed coaxially with the input shaft, and can be coupled with the parallel gear without being obstructed by the transmission case, which makes it possible to miniaturize the transmission.

BRIEF DESCRIPTION OF THE DRAWINGS

FIG. 3 is an explanatory diagram illustrating engagement states of engagement mechanisms in each gear speed of the automatic transmission according to the first embodiment.

FIG. 8 is an explanatory diagram illustrating engagement states of engagement mechanisms in each gear speed of the automatic transmission according to the fourth embodiment.

DETAILED DESCRIPTION OF THE PREFERRED EMBODIMENTS

Figure 1:
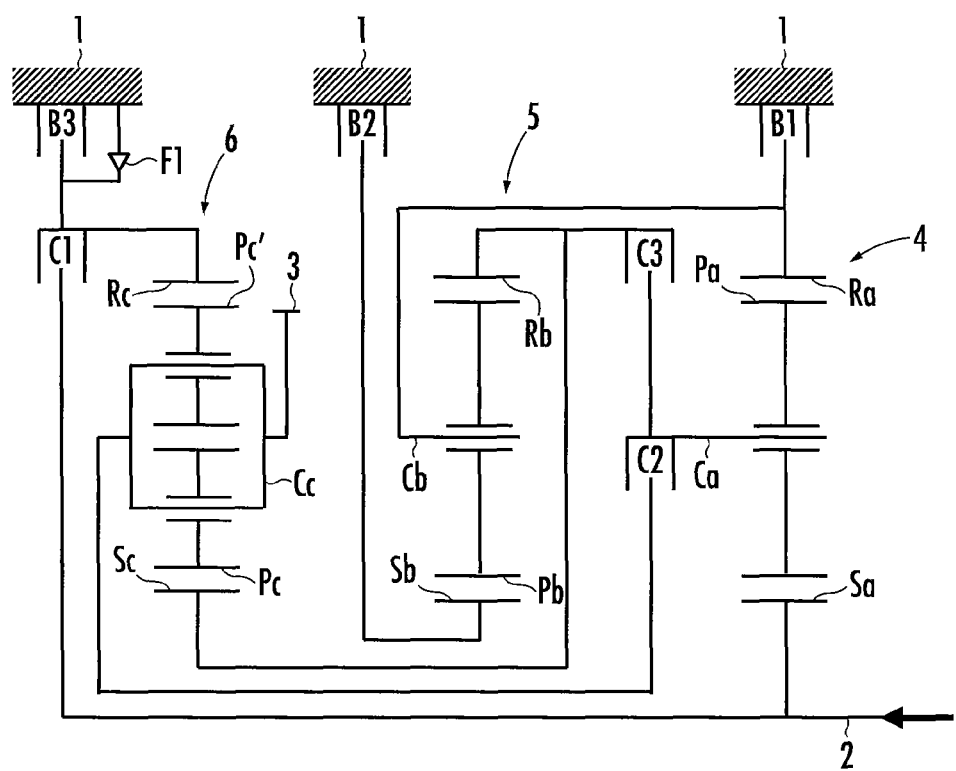
FIG. 1 is a skeleton diagram of an automatic transmission according to a first embodiment of the present invention.

An automatic transmission according to a first embodiment of the present invention is illustrated in FIG. 1. The automatic transmission of the first embodiment is provided with a transmission case 1, an input shaft 2 and an output member 3. The input shaft 2 is pivotally supported inside the transmission case 1 and coupled with a driving source such as an engine (not shown). The output member 3 is comprised of output gears disposed concentrically with the input shaft 2. Rotations of the output member 3 are transmitted to driving wheels disposed at both sides of a vehicle via a differential gear (not shown).

Further, a first planetary gear mechanism 4, a second planetary gear mechanism 5 and a third planetary gear mechanism 6 are disposed concentrically with the input shaft 2 inside the transmission case 1. The first planetary gear mechanism 4 is a single-pinion planetary gear mechanism comprised of a sun gear Sa, a ring gear Ra, and a carrier Ca pivotally supporting a pinion Pa intermeshed with the sun gear Sa and the ring gear Ra in such a way that the pinion Pa can rotate and revolve freely.

Figure 2:
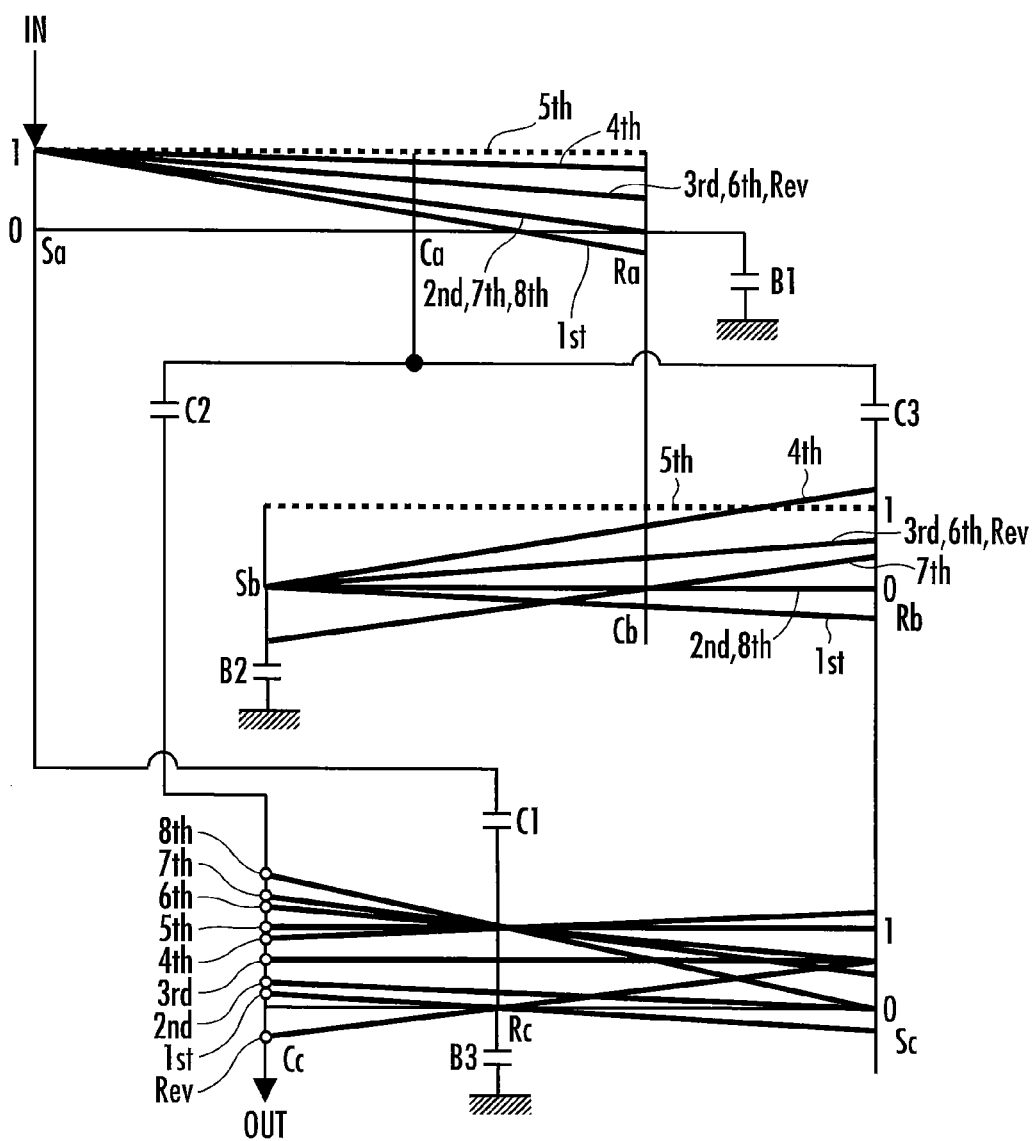
FIG. 2 is a velocity diagram for the automatic transmission according to the first embodiment of the present invention.

Referring to the top section of a velocity diagram (a diagram illustrating rotation velocities of three elements of the sun gear, the carrier and the ring gear by straight lines) for the first planetary gear mechanism 4 in FIG. 2, if the three elements composed of the sun gear Sa, the carrier Ca and the ring gear Ra of the first planetary gear mechanism 4 are arranged from the left side in the order of distances relative to gear ratios in the velocity diagram, they are equivalent to the first element, the second element and the third element, respectively.

Herein, when the gear ratio (number of teeth of the ring gear/number of teeth of the sun gear) of the first planetary gear mechanism 4 is supposed to be "i", the ratio of a distance between the sun gear Sa and the carrier Ca to a distance between the carrier Ca and the ring gear Ra is set to i:1. In the velocity diagram, the lower horizontal line and the upper horizontal line indicate a rotational speed of "0" and a rotational speed of "1" (equal to that of the input shaft 2), respectively.

The second planetary gear mechanism 5 is of a single-pinion planetary gear mechanism comprised of a sun gear Sb, a ring gear Rb and a carrier Cb pivotally supporting a pinion Pb intermeshed with the sun gear Sb and the ring gear Rb in such a way that the pinion Pb can rotate and revolve freely.

Referring to the middle section of a velocity diagram for the second planetary gear mechanism 5 in FIG. 2, if the three elements composed of the sun gear Sb, the carrier Cb and the ring gear Rb of the second planetary gear mechanism 5 are arranged from the left side in the order of distances relative to gear ratios in the velocity diagram, they are equivalent to the fourth element, the fifth element and the sixth element, respectively. When the gear ratio of the second planetary gear mechanism 5 is supposed to be "j", the ratio of a distance between the sun gear Sb and the carrier Cb to a distance between the carrier Cb and the ring gear Rb is set to j:1.

The third planetary gear mechanism 6 is of a double-pinion planetary gear mechanism comprised of a sun gear Sc, a ring gear Rc, and a carrier Cc pivotally supporting a pair of pinions Pc and Pc', which are intermeshed with each other with either one intermeshed with the sun gear Sc and the other one intermeshed with the ring gear Rc, in such a way that the pair of pinions Pc and Pc' can rotate and revolve freely.

Referring to the bottom section of a velocity diagram for the third planetary gear mechanism 6 in FIG. 2, if the three elements composed of the carrier Cc, the ring gear Rc and the sun gear Sc of the third planetary gear mechanism 6 are arranged from the left side in the order of distances relative to gear ratios in the velocity diagram, they are equivalent to the seventh element, the eighth element and the ninth element, respectively. When the gear ratio of the third planetary gear mechanism 6 is supposed to be "k", the ratio of a distance between the sun gear Sc and the carrier Cc to a distance between the carrier Cc and the ring gear Rc is set to k:1.

The sun gear Sa (the first element) of the first planetary gear mechanism 4 is coupled with the input shaft 2. The carrier Cc (the seventh element) of the third planetary gear mechanism 6 is coupled with the output member 3.

The ring gear Ra (the third element) of the first planetary gear mechanism 4 and the carrier Cb (the fifth element) of the second planetary gear mechanism 5 are coupled with each other to form a first coupling body Ra-Cb. The ring gear Rb (the sixth element) of the second planetary gear mechanism 5 and the sun gear Sc (the ninth element) of the third planetary gear mechanism 6 are coupled with each other to form a second coupling body Rb-Sc.

In the automatic transmission of the first embodiment, a total number of 7 rotation bodies are constituted in the three planetary gear mechanisms 4, 5 and 6, specifically, the sun gear Sa (the first element) and the carrier Ca (the second element) of the first planetary gear mechanism 4, the first coupling body Ra-Cb (the third-fifth elements), the sun gear Sb (the fourth element) of the second planetary gear mechanism 5, the second coupling body Rb-Sc (the sixth-ninth elements), the carrier Cc (the seventh element) and the ring gear Rc (the eighth element) of the third planetary gear mechanism 6.

The automatic transmission of the first embodiment is provided with engagement mechanisms comprised of wet multiplate clutches, specifically, a first clutch C1 equivalent to a first engagement mechanism coupled with the input shaft 2 and the ring gear Rc (the eighth element) of the third planetary gear mechanism 6 releasably, a second clutch C2 equivalent to a second engagement mechanism coupled with the carrier Ca (the second element) of the first planetary gear mechanism 4 and the carrier Cc (the seventh element) of the third planetary gear mechanism 6 releasably, and a third clutch C3 equivalent to a third engagement mechanism coupled with the carrier Ca (the second element) of the first planetary gear mechanism 4 and the second coupling body Rb-Sc (the sixth-ninth elements) releasably.

The clutch C3 equivalent to the third engagement mechanism is disposed at an outer position of the second clutch C2 equivalent to the second engagement mechanism in the radial direction thereof and overlapped with the second clutch C2 in the axial direction of the input shaft 2 to shorten the shaft length of the automatic transmission.

The automatic transmission of the first embodiment is provided with engagement mechanisms comprised of wet multiplate brakes, specifically, a first brake B1 equivalent to a fourth engagement mechanism fixing the first coupling body Ra-Cb (the third-fifth elements) to the transmission case 1 releasably, a second brake B2 equivalent to a fifth engagement mechanism fixing the sun gear Sb of the second planetary gear mechanism 5 to the transmission case 1 releasably, and a third brake B3 fixing the ring gear Rc (the eighth element) of the third planetary gear mechanism 6 to the transmission case 1 releasably.

A 1-way clutch F1 is disposed in parallel with the third brake B3 inside the transmission case 1, allowing the ring gear Rc (the eighth element) of the third planetary gear mechanism 6 to rotate positively (forward rotation) and preventing it from rotating negatively (reverse rotation).

The third brake B3 and the 1-way clutch F1 in the automatic transmission of the first embodiment constitute a sixth engagement mechanism of the present invention.

When the second clutch C2 (the second engagement mechanism) and the second brake B2 (the fifth engagement mechanism) are engaged in the automatic transmission of the first embodiment, the carrier Ca (the second element) of the first planetary gear mechanism 4 and the carrier Cc (the seventh element) of the third planetary gear mechanism 6 rotate at the same rotation speed, the rotation speed of the sun gear Sb (the fourth element) of the second planetary gear mechanism 5 becomes equal to "0", and the rotation speed of the ring gear Rc (the eighth element) of the third planetary gear mechanism 6 becomes equal to "0" due to the function of the 1-way clutch F1. Thereby, the velocity line of the three planetary gear mechanisms 4, 5 and 6 becomes a line denoted by "1st" in FIG. 2, and the first gear speed is established.

At this time, the third brake B3 is released, however, since the rotation speed of the ring gear Rc (the eighth element) of the third planetary gear mechanism 6 becomes equal to "0" due to the function of the 1-way clutch F1, no friction loss will be happened in the third brake B3. Moreover, the disposition of the 1-way clutch F1 makes it unnecessary to supply pressured oils to the third brake B3 and to stop supplying pressured oils thereto when the gear change is made between the first gear speed and the second gear speed, which improves the control on gear change between the first gear speed and the second gear speed.

In addition to the second clutch C2 (the second engagement mechanism) and the second brake B2 (the fifth engagement mechanism), when the third brake B3 is further engaged, the first gear speed is established with the engine braking in action.

When the second engagement mechanism C2, the fourth engagement mechanism B1 and the fifth engagement mechanism B2 are engaged, both the rotation speed of the first coupling body Ra-Cb (the third-fifth elements) and the rotation speed of the sun gear Sb (the fourth element) of the second planetary gear mechanism 5 become equal to "0", the three elements of the second planetary gear mechanism 5 are locked in a state where relative rotations are impossible, therefore, the rotation speed of the second coupling body Rb-Sc (the sixth-ninth elements) also becomes equal to "0".

Thereby, the carrier Ca (the second element) of the first planetary gear mechanism 4 and the carrier Cc (the seventh element) of the third planetary gear mechanism 6 rotate at the same rotation speed, the velocity line of the three planetary gear mechanisms 4, 5 and 6 becomes a line denoted by "2nd" in FIG. 2, and the second gear speed is established.

When the second engagement mechanism C2, the third engagement mechanism C3 and the fifth engagement mechanism B2 are engaged, the carrier Ca (the second element) of the first planetary gear mechanism 4, the second coupling body Rb-Sc (the sixth-ninth elements) and the carrier Cc (the seventh element) of the third planetary gear mechanism 6 rotate at the same rotation speed, the three elements, namely the sun gear Sc, the carrier Cc and the ring gear Rc of the third planetary gear mechanism 6 are locked in a state where relative rotations are impossible. Thereby, the velocity line of the three planetary gear mechanisms 4, 5 and 6 becomes a line denoted by "3rd" in FIG. 2, and the third gear speed is established.

When the first engagement mechanism C1, the second engagement mechanism C2 and the fifth engagement mechanism B2 are engaged, the rotation speed of the sun gear Sa (the first element) of the first planetary gear mechanism 4 and the rotation speed of the ring gear Rc (the eighth element) of the third planetary gear mechanism 6 become equal to "1", and the carrier Ca (the second element) of the first planetary gear mechanism 4 and the carrier Cc (the seventh element) of the third planetary gear mechanism 6 rotate at the same rotation speed. Thereby, the velocity line of the three planetary gear mechanisms 4, 5 and 6 becomes a line denoted by "4th" in FIG. 2, and the fourth gear speed is established.

When the first engagement mechanism C1, the second engagement mechanism C2 and the third engagement mechanism C3 are engaged, the rotation speed of the sun gear Sa (the first element) of the first planetary gear mechanism 4 and the rotation speed of the ring gear Rc (the eighth element) of the third planetary gear mechanism 6 become equal to "1", the three elements, namely the sun gear Sc, the carrier Cc and the ring gear Rc of the third planetary gear mechanism 6 are locked in a state where relative rotations are impossible.

Thereby, the fifth gear speed is established at "1" which is also the rotation speed of the carrier Cc of the third planetary gear mechanism 6 coupled with the output member 3.

When the first engagement mechanism C1, the third engagement mechanism C3 and the fifth engagement mechanism B2 are engaged, the rotation speed of the sun gear Sa (the first element) of the first planetary gear mechanism 4 and the rotation speed of the ring gear Rc (the eighth element) of the third planetary gear mechanism 6 become equal to "1", the rotation speed of the sun gear Sb (the fourth element) of the second planetary gear mechanism 5 becomes equal to "0", and the carrier Ca (the second element) of the first planetary gear mechanism 4 and the second coupling body Rb-Sc (the sixth-ninth elements) rotate at the same rotation speed. Thereby, the velocity line of the three planetary gear mechanisms 4, 5 and 6 becomes a line denoted by "6th" in FIG. 2, and the sixth gear speed is established.

When the first engagement mechanism C1, the third engagement mechanism C3 and the fourth engagement mechanism B1 are engaged, the rotation speed of the sun gear Sa (the first element) of the first planetary gear mechanism 4 and the rotation speed of the ring gear Rc (the eighth element) of the third planetary gear mechanism 6 become equal to "1", the rotation speed of the first coupling body Ra-Cb (the third-fifth elements) becomes equal to "0", and the carrier Ca (the second element) of the first planetary gear mechanism 4 and the second coupling body Rb-Sc (the sixth-ninth elements) rotate at the same rotation speed. Thereby, the velocity line of the three planetary gear mechanisms 4, 5 and 6 becomes a line denoted by "7th" in FIG. 2, and the seventh gear speed is established.

When the first engagement mechanism C1, the fourth engagement mechanism B1 and the fifth engagement mechanism B2 are engaged, the rotation speed of the sun gear Sa (the first element) of the first planetary gear mechanism 4 and the rotation speed of the ring gear Rc (the eighth element) of the third planetary gear mechanism 6 become equal to "1", the rotation speed of the sun gear Sb (the fourth element) of the second planetary gear mechanism 5 and the rotation speed of the first coupling body Ra-Cb (the third-fifth elements) become equal to "0".

Thereby, the three elements, namely the sun gear Sb, the carrier Cb and the ring gear Rb of the second planetary gear mechanism 5 are locked in a state where relative rotations are impossible, the rotation speed of the second coupling body Rb-Sc (the sixth-ninth elements) becomes equal to "0". Thereby, the velocity line of the three planetary gear mechanisms 4, 5 and 6 becomes a line denoted by "8th" in FIG. 2, and the eighth gear speed is established.

When the third engagement mechanism C3, the fifth engagement mechanism B2 and the sixth engagement mechanism B3 are engaged, the rotation speed of the sun gear Sb (the fourth element) of the second planetary gear mechanism 5 and the rotation speed of the ring gear Rc (the eighth element) of the third planetary gear mechanism 6 become equal to "0", the carrier Ca (the second element) of the first planetary gear mechanism 4 and the second coupling body Rb-Sc (the sixth-ninth elements) rotate at the same rotation speed. Thereby, the velocity line of the three planetary gear mechanisms 4, 5 and 6 becomes a line denoted by "Rev" in FIG. 2, and the reverse gear speed is established.

The dotted velocity line in FIG. 2 denotes that each element of the other planetary gears in the three planetary gear mechanisms 4, 5 and 6 is rotating in follow of the planetary gear transmitting the driving force.

FIG. 3 is an explanatory diagram illustrating relationships between each of the mentioned gear speeds and each of the engagement states of the mentioned engagement mechanisms of C1 to C3 and B1 to B3. The sign "O" denotes engagement. A gear ratio (rotation speed of the input shaft 2/rotation speed of the output member 3) of each gear speed when the gear ratio i of the first planetary gear mechanism 4, the gear ratio j of the second planetary gear mechanism 5 and the gear ratio k of the third planetary gear mechanism 6 are set to 1.666, 1.666 and 2.666, respectively, is represented in FIG. 3. Thereby, a common ratio (a ratio between gear ratios of each gear speed) becomes appropriate, and a ratio range (the first speed ratio/the eighth speed ratio) of 8 gear speeds denoted in the common ratio column also becomes appropriate.

According to the automatic transmission of the first embodiment, the gear change can be performed to generate the 8 forward gear speeds, and for each gear speed, there are three engagement mechanisms out of the six engagement mechanisms of the first engagement mechanism C1 to the third engagement mechanism C3 and the fourth engagement mechanism B1 to the sixth engagement B3 engaged. Thereby, in each gear speed change, the freed engagement mechanisms are three. In comparison with the conventional transmission in which the freed engagement mechanisms are four, the friction loss caused by the freed engagement mechanisms is reduced, and consequently, the efficiency of the automatic transmission is improved.

The automatic transmission of the first embodiment is described to perform gear change between the 8 forward gear speeds; however, it is acceptable to configure the automatic transmission to perform gear change between 7 forward gear speeds by omitting either one of the gear speeds. For example, the seventh gear speed in the first embodiment may be omitted and the eighth gear speed is set as the seventh gear speed, the automatic transmission can perform gear change between 7 forward gear speeds.

In the automatic transmission of the first embodiment, the first planetary gear mechanism 4 is configured as a single-pinion type; however, it is acceptable to configure the first planetary gear mechanism 4 to a double-pinion type. In this regard, for example, the first element may be set as the sun gear Sa, the second element may be set as the ring gear Ra and the third element may be set as the carrier Ca.

Figure 4:
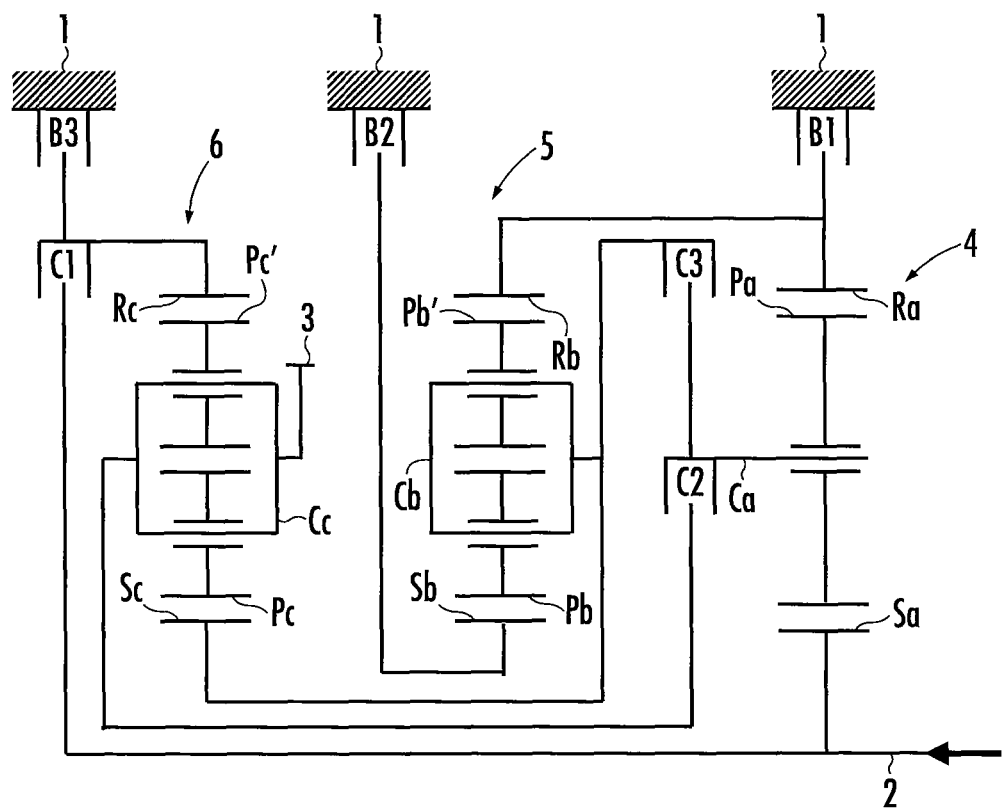
FIG. 4 is a skeleton diagram of an automatic transmission according to a second embodiment of the present invention.

In the automatic transmission of the first embodiment, the second planetary gear mechanism 5 is configured as a single-pinion type; however, as an automatic transmission of a second embodiment illustrated in FIG. 4, it is acceptable to configure the second planetary gear mechanism 5 to a double-pinion type. In this regard, for example, the fourth element may be set as the sun gear Sb, the fifth element may be set as the ring gear Rb and the sixth element may be set as the carrier Cb.

In the automatic transmission of the first embodiment, the sixth engagement mechanism is configured as the third brake B3 and the 1-way clutch F1; however, it is acceptable to omit the 1-way clutch F1 and leave only the third brake B3.

Figure 5:
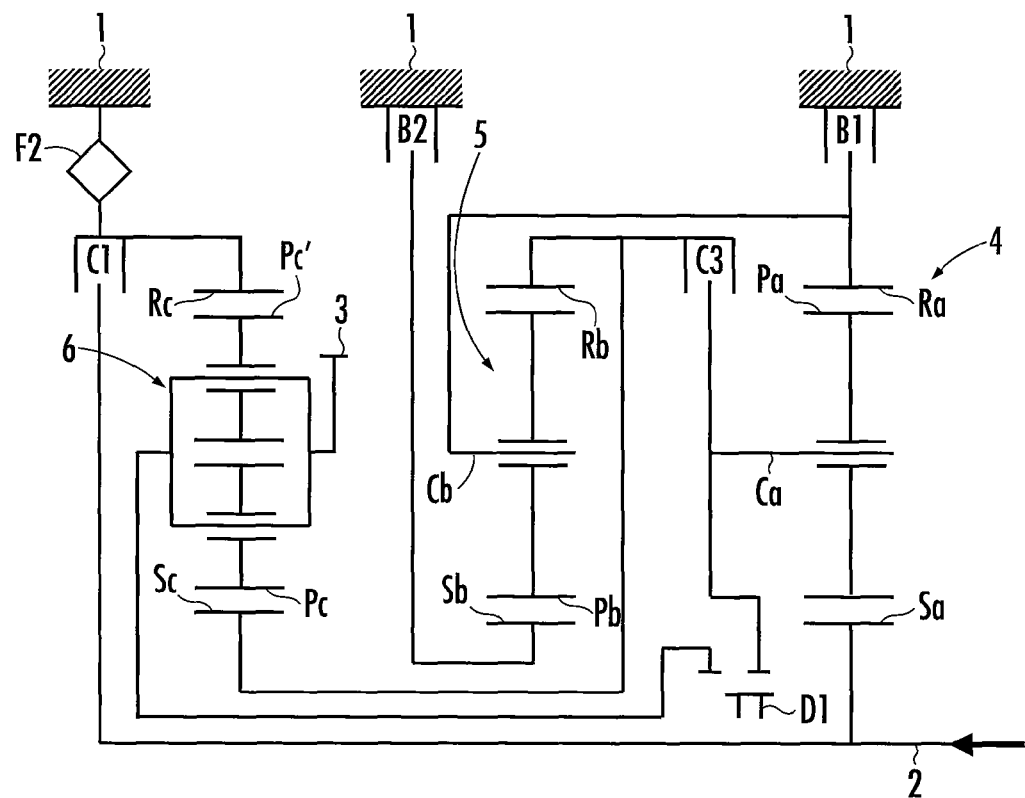
FIG. 5 is a skeleton diagram of an automatic transmission according to a third embodiment of the present invention.

Moreover, as an automatic transmission of a third embodiment illustrated in FIG. 5, it is acceptable to configure the sixth engagement mechanism to a 2-way clutch F2 capable of switching between a state where the positive rotation (forward rotation) of the ring gear Rc of the third planetary gear mechanism 6 is allowed and the negative rotation (reverse rotation) thereof is prevented and a state where the positive rotation of the ring gear Rc is prevented and the negative rotation thereof is allowed.

In this regard, similar to the case where the 1-way clutch F1 is disposed, the control on the gear change between the first gear speed and the second gear speed can be improved. Moreover, the third brake B3, which is used in reverse gear change and has a relatively large volume, may be omitted to further reduce the friction loss, and consequently, the efficiency of the automatic transmission can be improved.

In the automatic transmission of the third embodiment illustrated in FIG. 5, the second engagement mechanism is comprised of a dog clutch D1 (intermeshing mechanism). As clearly illustrated in FIG. 3, the second engagement mechanism (equivalent to the second clutch C2 of the first embodiment) is engaged in the range of low gear speeds from the first gear speed to the fifth gear speed and released in the range of high gear speeds from the sixth gear speed to the eighth gear speed.

Thus, in the range of low gear speeds from the first to the fifth gear speed where a torque difference between adjacent gear speeds is greater in comparison with the range of high gear speeds, the switching between the engaging states is not performed. The engaging states will be switched only between the fifth gear speed and the sixth gear speed where the torque difference is relatively small. Thereby, the gear change between the fifth gear speed and the sixth gear speed can be performed smoothly.

Different from the wet multi-plate clutch engaged through friction, since the dog clutch D1 is engaged through mechanical intermeshing, there is no friction loss occurred. Therefore, compared with the second engagement mechanism configured from the wet multi-plate clutch C2 in the first embodiment, by configuring the second engagement mechanism from the dog clutch D1, it is possible to further reduce the friction loss in the range of high gear speeds, improving the millage of the vehicle. In addition, it is acceptable to configure the dog clutch D1 as a synchromesh mechanism or the like having synchromesh functions.

Figure 6:
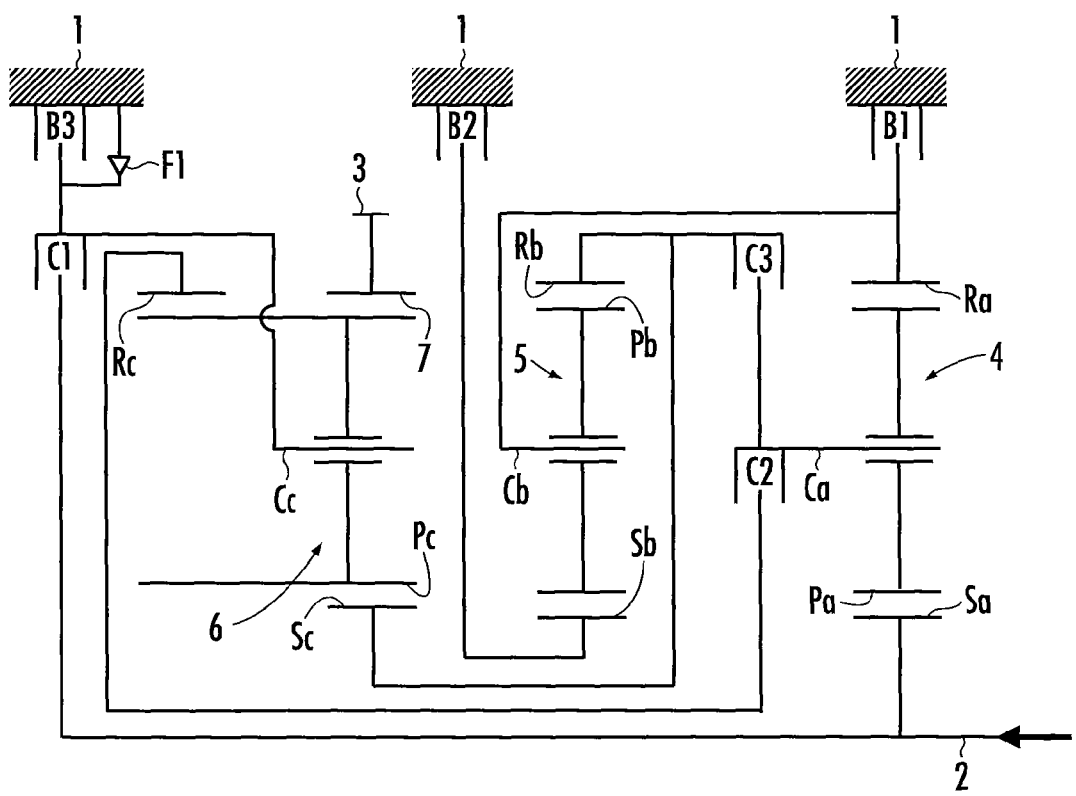
FIG. 6 is a skeleton diagram of an automatic transmission according to a fourth embodiment of the present invention.

An automatic transmission according to a fourth embodiment of the present invention is illustrated in FIG. 6. The automatic transmission of the fourth embodiment is provided with a transmission case 1, an input shaft 2 and an output member 3. The input shaft 2 is pivotally supported inside the transmission case 1 and coupled with a driving source such as an engine (not shown). The output member 3 is comprised of output gears disposed concentrically with the input shaft 2. Rotations of the output member 3 are transmitted to driving wheels disposed at both sides of a vehicle via a differential gear (not shown).

Further, a first planetary gear mechanism 4, a second planetary gear mechanism 5 and a third planetary gear mechanism 6 are disposed concentrically with the input shaft 2 inside the transmission case 1. The first planetary gear mechanism 4 is of a single-pinion planetary gear mechanism comprised of a sun gear Sa, a ring gear Ra, and a carrier Ca pivotally supporting a pinion Pa intermeshed with the sun gear Sa and the ring gear Ra in such a way that the pinion Pa can rotate and revolve freely.

Figure 7:
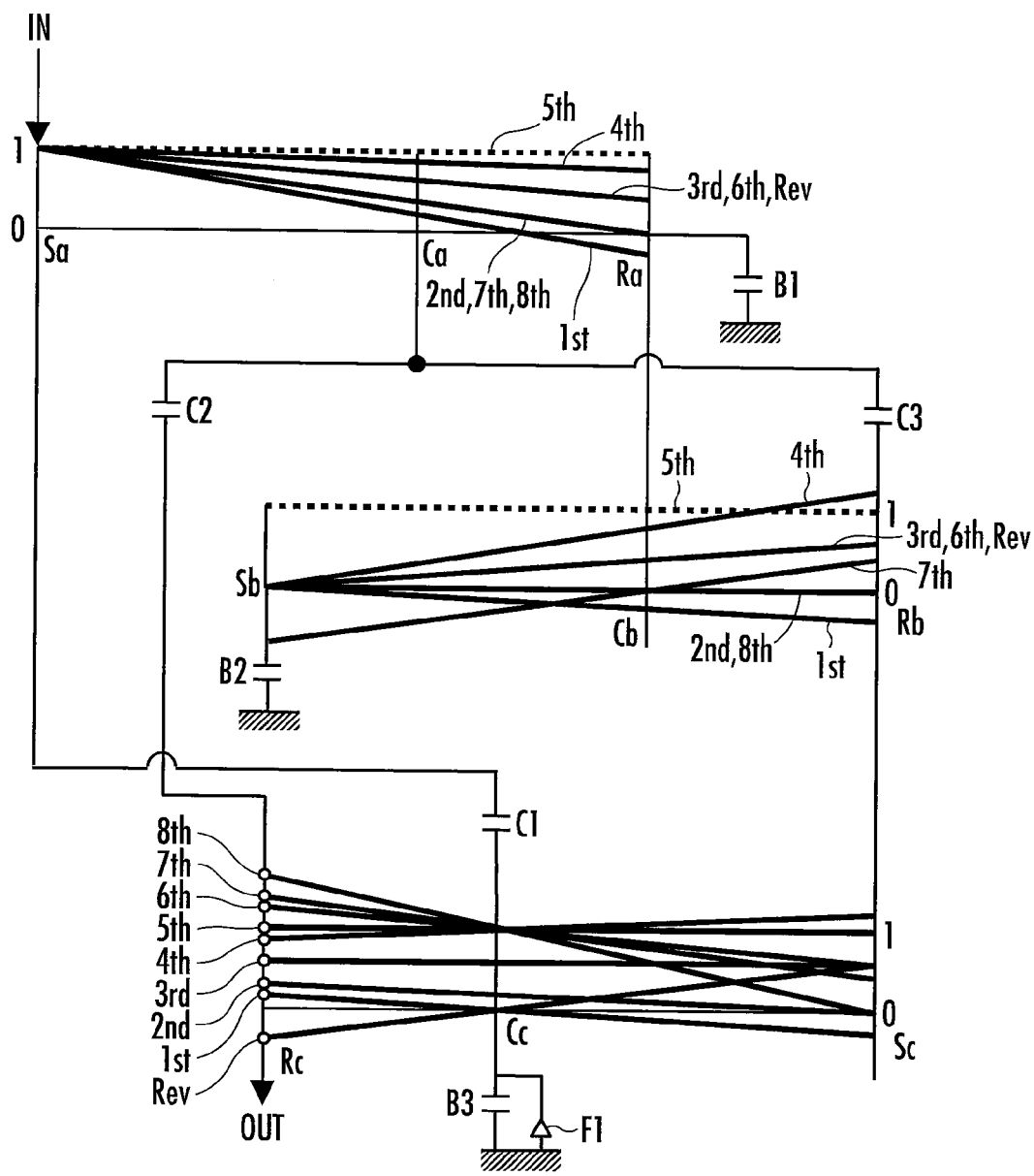
FIG. 7 is a velocity diagram for planetary gears according to the fourth embodiment of the present invention.

Referring to the top section of a velocity diagram (a diagram illustrating rotation velocities of three elements of the sun gear, the carrier and the ring gear by straight lines) for the first planetary gear mechanism 4 in FIG. 7, if the three elements composed of the sun gear Sa, the carrier Ca and the ring gear Ra of the first planetary gear mechanism 4 are arranged from the left side in the order of distances relative to gear ratios in the velocity diagram, they are equivalent to the first element, the second element and the third element, respectively.

Herein, when the gear ratio (number of teeth of the ring gear/number of teeth of the sun gear) of the first planetary gear mechanism 4 is supposed to be "i", the ratio of a distance between the sun gear Sa and the carrier Ca to a distance between the carrier Ca and the ring gear Ra is set to i:1. In the velocity diagram, the lower horizontal line and the upper horizontal line indicate a rotational speed of "0" and a rotational speed of "1" (equal to that of the input shaft 2), respectively.

The second planetary gear mechanism 5 is of a single-pinion planetary gear mechanism comprised of a sun gear Sb, a ring gear Rb and a carrier Cb pivotally supporting a pinion Pb intermeshed with the sun gear Sb and the ring gear Rb in such a way that the pinion Pb can rotate and revolve freely.

Referring to the middle section of a velocity diagram for the second planetary gear mechanism 5 in FIG. 7, if the three elements composed of the sun gear Sb, the carrier Cb and the ring gear Rb of the second planetary gear mechanism 5 are arranged from the left side in the order of distances relative to gear ratios in the velocity diagram, they are equivalent to the fourth element, the fifth element and the sixth element, respectively. When the gear ratio of the second planetary gear mechanism 5 is supposed to be "j", the ratio of a distance between the sun gear Sb and the carrier Cb to a distance between the carrier Cb and the ring gear Rb is set to j:1.

The third planetary gear mechanism 6 is of a single-pinion planetary gear mechanism comprised of a sun gear Sc, a ring gear Rc, and a carrier Cc pivotally supporting a pinion Pc intermeshed with the sun gear Sc and the ring gear Rc in such a way that the pinion Pc can rotate and revolve freely.

Referring to the bottom section of a velocity diagram for the third planetary gear mechanism 6 in FIG. 7, if the three elements composed of the ring gear Rc, the carrier Cc and the sun gear Sc of the third planetary gear mechanism 6 are arranged from the left side in the order of distances relative to gear ratios in the velocity diagram, they are equivalent to the seventh element, the eighth element and the ninth element, respectively. When the gear ratio of the third planetary gear mechanism 6 is supposed to be "k", the ratio of a distance between the sun gear Sc and the carrier Cc to a distance between the carrier Cc and the ring gear Rc is set to k:1.

The automatic transmission of the fourth embodiment is provided with a parallel gear 7 disposed adjacent to the ring gear Rc (the seventh element) of the third planetary gear mechanism 6 and intermeshed with the pinion Pc of the third planetary gear mechanism 6. The parallel gear 7 is configured to have a ring shape with the same inner diameter and the same number of teeth on the inner circumference as the ring gear Rc (the seventh element) and to rotate at the same rotation speed as the ring gear Rc (the seventh element) of the third planetary gear mechanism 6.

The sun gear Sa (the first element) of the first planetary gear mechanism 4 is coupled with the input shaft 2. The parallel gear 7 disposed in parallel to the ring gear Rc (the seventh element) of the third planetary gear mechanism 6 is coupled with the output member 3 equivalent to the output gear.

The ring gear Ra (the third element) of the first planetary gear mechanism 4 and the carrier Cb (the fifth element) of the second planetary gear mechanism 5 are coupled with each other to form a first coupling body Ra-Cb. The ring gear Rb (the sixth element) of the second planetary gear mechanism 5 and the sun gear Sc (the ninth element) of the third planetary gear mechanism 6 are coupled with each other to form a second coupling body Rb-Sc.

In the automatic transmission of the fourth embodiment, a total number of 7 rotation bodies are constituted in the three planetary gear mechanisms 4, 5 and 6, specifically, the sun gear Sa (the first element) and the carrier Ca (the second element) of the first planetary gear mechanism 4, the first coupling body Ra-Cb (the third-fifth elements), the sun gear Sb (the fourth element) of the second planetary gear mechanism 5, the second coupling body Rb-Sc (the sixth-ninth elements), the ring gear Rc (the seventh element) and the carrier Cc (the eighth element) of the third planetary gear mechanism 6.

The automatic transmission of the fourth embodiment is provided with engagement mechanisms comprised of wet multi-plate clutches, specifically, a first clutch C1 equivalent to a first engagement mechanism coupled with the input shaft 2 and the carrier Cc (the eighth element) of the third planetary gear mechanism 6 releasably, a second clutch C2 equivalent to a second engagement mechanism coupled with the carrier Ca (the second element) of the first planetary gear mechanism 4 and the ring gear Rc (the seventh element) of the third planetary gear mechanism 6 releasably, and a third clutch C3 equivalent to a third engagement mechanism coupled with the carrier Ca (the second element) of the first planetary gear mechanism 4 and the second coupling body Rb-Sc releasably.

The clutch C3 equivalent to the third engagement mechanism is disposed at an outer position of the second clutch C2 equivalent to the second engagement mechanism in the radial direction thereof and overlapped with the second clutch C2 in the axial direction of the input shaft 2 to shorten the shaft length of the automatic transmission.

The automatic transmission of the fourth embodiment is provided with engagement mechanisms comprised of wet multi-plate brakes, specifically, a first brake B1 equivalent to a fourth engagement mechanism fixing the first coupling body Ra-Cb (the third-fifth elements) to the transmission case 1 releasably, a second brake B2 equivalent to a fifth engagement mechanism fixing the sun gear Sb of the second planetary gear mechanism 5 to the transmission case 1 releasably, and a third brake B3 fixing the carrier Cc (the eighth element) of the third planetary gear mechanism 6 to the transmission case 1 releasably.

A 1-way clutch F1 is disposed in parallel with the third brake B3 inside the transmission case 1, allowing the carrier Cc (the eighth element) of the third planetary gear mechanism 6 to rotate positively (forward rotation) and preventing it from rotating negatively (reverse rotation).

The third brake B3 and the 1-way clutch F1 are disposed at an outer position of the ring gear Rc (the seventh element) of the third planetary gear mechanism 6 in the radial direction thereof. The third brake B3 and the 1-way clutch F1 in the automatic transmission of the fourth embodiment constitute the sixth engagement mechanism of the present invention.

When the second clutch C2 (the second engagement mechanism) and the second brake B2 (the fifth engagement mechanism) are engaged in the automatic transmission of the fourth embodiment, the carrier Ca (the second element) of the first planetary gear mechanism 4 and the ring gear Rc (the seventh element) of the third planetary gear mechanism 6 rotate at the same rotation speed, the rotation speed of the sun gear Sb (the fourth element) of the second planetary gear mechanism 5 becomes equal to "0", and the rotation speed of the carrier Cc (the eighth element) of the third planetary gear mechanism 6 becomes equal to "0" due to the function of the 1-way clutch F1. Thereby, the velocity line of the three planetary gear mechanisms 4, 5 and 6 becomes a line denoted by "1st" in FIG. 7, and the first gear speed is established.

At this time, the third brake B3 is released, however, since the rotation speed of the carrier Cc (the eighth element) of the third planetary gear mechanism 6 becomes equal to "0" due to the function of the 1-way clutch F1, no friction loss will be happened in the third brake B3. Moreover, the disposition of the 1-way clutch F1 makes it unnecessary to supply pressured oils to the third brake B3 and to stop supplying pressured oils thereto when the gear change is made between the first gear speed and the second gear speed, which improves the control on gear change between the first gear speed and the second gear speed.

In addition to the second clutch C2 (the second engagement mechanism) and the second brake B2 (the fifth engagement mechanism), when the third brake B3 is further engaged, the first gear speed is established with the engine braking in action.

When the second clutch C2, the first brake B1 and the second brake B2 are engaged, both the rotation speed of the first coupling body Ra-Cb (the third-fifth elements) and the rotation speed of the sun gear Sb (the fourth element) of the second planetary gear mechanism 5 become equal to "0", the three elements of the second planetary gear mechanism 5 are locked in a state where relative rotations are impossible, therefore, the rotation speed of the second coupling body Rb-Sc (the sixth-ninth elements) also becomes equal to "0".

Thereby, the carrier Ca (the second element) of the first planetary gear mechanism 4 and the ring gear Rc (the seventh element) of the third planetary gear mechanism 6 rotate at the same rotation speed, the velocity line of the three planetary gear mechanisms 4, 5 and 6 becomes a line denoted by "2nd" in FIG. 7, and the second gear speed is established.

When the second clutch C2, the third clutch C3 and the second brake B2 are engaged, the carrier Ca (the second element) of the first planetary gear mechanism 4, the second coupling body Rb-Sc (the sixth-ninth elements) and the ring gear Rc (the seventh element) of the third planetary gear mechanism 6 rotate at the same rotation speed, the three elements, namely sun gear Sc, the carrier Cc and the ring gear Rc of the third planetary gear mechanism 6 are locked in a state where relative rotations are impossible. Thereby, the velocity line of the three planetary gear mechanisms 4, 5 and 6 becomes a line denoted by "3rd" in FIG. 7, and the third gear speed is established.

When the first clutch C1, the second clutch C2 and the second brake B2 are engaged, the rotation speed of the sun gear Sa (the first element) of the first planetary gear mechanism 4 and the rotation speed of the carrier Cc (the eighth element) of the third planetary gear mechanism 6 become equal to "1", and the carrier Ca (the second element) of the first planetary gear mechanism 4 and the ring gear Rc (the seventh element) of the third planetary gear mechanism 6 rotate at the same rotation speed. Thereby, the velocity line of the three planetary gear mechanisms 4, 5 and 6 becomes a line denoted by "4th" in FIG. 7, and the fourth gear speed is established.

When the first clutch C1, the second clutch C2 and the third clutch C3 are engaged, the rotation speed of the sun gear Sa (the first element) of the first planetary gear mechanism 4 and the rotation speed of the carrier Cc (the eighth element) of the third planetary gear mechanism 6 become equal to "1", the three elements, namely the sun gear Sc, the carrier Cc and the ring gear Rc of the third planetary gear mechanism 6 are locked in a state where relative rotations are impossible. Thereby, the fifth gear speed is established at "1" which is also the rotation speed of the carrier Cc of the third planetary gear mechanism 6 coupled with the output member 3.

When the first clutch C1, the third clutch C3 and the second brake B2 are engaged, the rotation speed of the sun gear Sa (the first element) of the first planetary gear mechanism 4 and the rotation speed of the carrier Cc (the eighth element) of the third planetary gear mechanism 6 become equal to "1", the rotation speed of the sun gear Sb (the fourth element) of the second planetary gear mechanism 5 becomes equal to "0", and the carrier Ca (the second element) of the first planetary gear mechanism 4 and the second coupling body Rb-Sc (the sixth-ninth elements) rotate at the same rotation speed. Thereby, the velocity line of the three planetary gear mechanisms 4, 5 and 6 becomes a line denoted by "6th" in FIG. 7, and the sixth gear speed is established.

When the first clutch C1, the third clutch C3 and the first brake B1 are engaged, the rotation speed of the sun gear Sa (the first element) of the first planetary gear mechanism 4 and the rotation speed of the carrier Cc (the eighth element) of the third planetary gear mechanism 6 become equal to "1", the rotation speed of the first coupling body Ra-Cb (the third-fifth elements) becomes equal to "0", and the carrier Ca (the second element) of the first planetary gear mechanism 4 and the second coupling body Rb-Sc (the sixth-ninth elements) rotate at the same rotation speed. Thereby, the velocity line of the three planetary gear mechanisms 4, 5 and 6 becomes a line denoted by "7th" in FIG. 7, and the seventh gear speed is established.

When the first clutch C1, the first brake B1 and the second brake B2 are engaged, the rotation speed of the sun gear Sa (the first element) of the first planetary gear mechanism 4 and the rotation speed of the carrier Cc (the eighth element) of the third planetary gear mechanism 6 become equal to "1", the rotation speed of the sun gear Sb (the fourth element) of the second planetary gear mechanism 5 and the rotation speed of the first coupling body Ra-Cb (the third-fifth elements) become equal to "0".

Thereby, the three elements, namely the sun gear Sb, the carrier Cb and the ring gear Rb of the second planetary gear mechanism 5 are locked in a state where relative rotations are impossible, the rotation speed of the second coupling body Rb-Sc (the sixth-ninth elements) becomes equal to "0". Thereby, the velocity line of the three planetary gear mechanisms 4, 5 and 6 becomes a line denoted by "8th" in FIG. 7, and the eighth gear speed is established.

When the third clutch C3, the second brake B2 and the third brake B3 are engaged, the rotation speed of the sun gear Sb (the fourth element) of the second planetary gear mechanism 5 and the rotation speed of the carrier Cc (the eighth element) of the third planetary gear mechanism 6 become equal to "0", the carrier Ca (the second element) of the first planetary gear mechanism 4 and the second coupling body Rb-Sc (the sixth-ninth elements) rotate at the same rotation speed. Thereby, the velocity line of the three planetary gear mechanisms 4, 5 and 6 becomes a line denoted by "Rev" in FIG. 7, and the reverse gear speed is established.

The dotted velocity line in FIG. 7 denotes that each element of the other planetary gears in the three planetary gear mechanisms 4, 5 and 6 is rotating in follow of the planetary gear transmitting the driving force.

FIG. 8 is an explanatory diagram illustrating relationships between each of the mentioned gear speeds and each of the engagement states of the mentioned engagement mechanisms of C1 to C3 and B1 to B3. The sign "0" denotes engagement. A gear ratio (rotation speed of the input shaft 2/rotation speed of the output member 3) of each gear speed when the gear ratio i of the first planetary gear mechanism 4, the gear ratio j of the second planetary gear mechanism 5 and the gear ratio k of the third planetary gear mechanism 6 are set to 1.666, 1.666 and 1.666, respectively, is represented in FIG. 8. Thereby, a common ratio (a ratio between gear ratios of each gear speed) becomes appropriate, and a ratio range (the first speed ratio/the eighth speed ratio) of 8 gear speeds denoted in the common ratio column also becomes appropriate.

According to the automatic transmission of the fourth embodiment, the gear change can be performed to generate the 8 forward gear speeds, and for each gear speed, there are three engagement mechanisms out of the six engagement mechanisms of the first engagement mechanism C1 to the third engagement mechanism C3 and the fourth engagement mechanism B1 to the sixth engagement B3 engaged. Thereby, in each gear speed change, the freed engagement mechanisms are three. In comparison with the conventional transmission in which the freed engagement mechanisms are four, the friction loss caused by the freed engagement mechanisms is reduced, and consequently, the efficiency of the automatic transmission is improved.

Although structurally it is impossible to couple directly the ring gear Rc (the seventh element) of the third planetary gear mechanism 6 with the output member 3, by coupling the output member 3 with the parallel gear 7 which rotates at the same rotation speed with the ring gear Rc (the seventh element), the rotation speed of the ring gear Rc (the seventh element) of the third planetary gear mechanism 6 can be output out through the output member 3.

The automatic transmission of the fourth embodiment is described to perform gear change between the 8 forward gear speeds; however, it is acceptable to configure the automatic transmission to perform gear change between 7 forward gear speeds by omitting either one of the gear speeds. For example, the seventh gear speed in the fourth embodiment may be omitted and the eighth gear speed is set as the seventh gear speed, the automatic transmission can perform gear change between 7 forward gear speeds.

In the automatic transmission of the fourth embodiment, the first planetary gear mechanism 4 is configured as a single-pinion type; however, it is acceptable to configure the first planetary gear mechanism 4 to a double-pinion type. In this regard, for example, the first element may be set as the sun gear Sa, the second element may be set as the ring gear Ra and the third element may be set as the carrier Ca.

Figure 9:
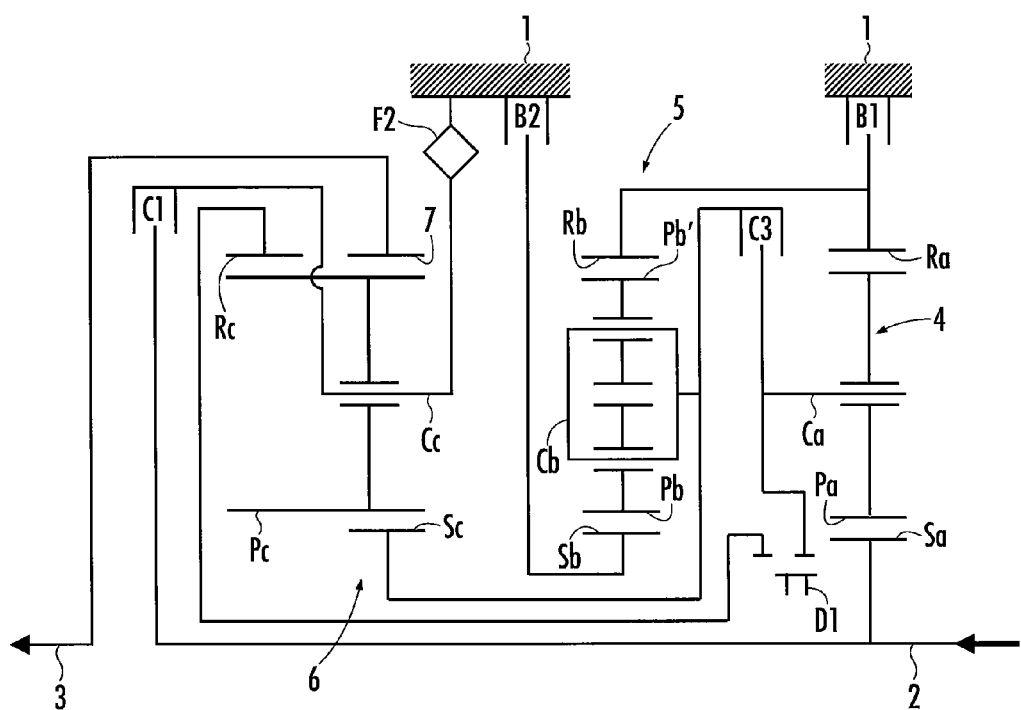
FIG. 9 is a skeleton diagram of an automatic transmission according to a fifth embodiment of the present invention.

In the automatic transmission of the fourth embodiment, the second planetary gear mechanism 5 is configured as a single-pinion type; however, as an automatic transmission of a fifth embodiment illustrated in FIG. 9, it is acceptable to configure the second planetary gear mechanism 5 to a double-pinion type. In this regard, for example, the fourth element may be set as the sun gear Sb, the fifth element may be set as the ring gear Rb and the sixth element may be set as the carrier Cb.

In the automatic transmission of the fourth embodiment, the sixth engagement mechanism is configured as the third brake B3 and the 1-way clutch F1; however, it is acceptable to omit the 1-way clutch F1 and leave only the third brake B3.

Moreover, as the automatic transmission of the fifth embodiment illustrated in FIG. 9, it is acceptable to configure the sixth engagement mechanism to a 2-way clutch F2 capable of switching between a state where the positive rotation (forward rotation) of the ring gear Rc of the third planetary gear mechanism 6 is allowed and the negative rotation (reverse rotation) thereof is prevented and a state where the positive rotation of the ring gear Rc is prevented and the negative rotation thereof is allowed.

In this regard, similar to the case where the 1-way clutch F1 is disposed, the control on the gear change between the first gear speed and the second gear speed can be improved. Moreover, the third brake B3, which is used in reverse gear change and has a relatively large volume, may be omitted to further reduce the friction loss, and consequently, the efficiency of the automatic transmission can be improved.

In the automatic transmission of the fifth embodiment illustrated in FIG. 9, the second engagement mechanism is comprised of a dog clutch D1 (intermeshing mechanism). As clearly illustrated in FIG. 8, the second engagement mechanism (equivalent to the second clutch C2 of the fourth embodiment) is engaged in the range of low gear speeds from the first gear speed to the fifth gear speed and released in the range of high gear speeds from the sixth gear speed to the eighth gear speed.

Thus, in the range of low gear speeds from the first to the fifth gear speed where a torque difference between adjacent gear speeds is greater in comparison with the range of high gear speeds, the switching between the engaging states is not performed. The engaging states will be switched only between the fifth gear speed and the sixth gear speed where the torque difference is relatively small. Thereby, the gear change between the fifth gear speed and the sixth gear speed can be performed smoothly.

Different from the wet multi-plate clutch engaged through friction, since the dog clutch D1 is engaged through mechanical intermeshing, there is no friction loss occurred. Therefore, compared with the second engagement mechanism configured from the wet multi-plate clutch C2 in the fourth embodiment, by configuring the second engagement mechanism from the dog clutch D1, it is possible to further reduce the friction loss in the range of high gear speeds, improving the millage of the vehicle. In addition, it is acceptable to configure the dog clutch D1 as a synchromesh mechanism or the like having synchromesh functions.

In the present embodiment, the parallel gear 7 is configured to have a ring shape with the same inner diameter and the same number of teeth on the inner circumference as the ring gear Rc (the seventh element) of the third planetary gear mechanism 6; however, it is not limited thereto, the parallel gear 7 may be configured to have an inner diameter and the number of teeth different from the ring gear Rc (the seventh element).

In this case, for example, the pinion Pc of the third planetary gear mechanism 6 is configured as a stepped pinion with a smaller diameter portion and a greater diameter portion, the smaller diameter portion or the greater diameter portion of the pinion Pc is configured to be intermeshed with the sun gear Sc and the ring gear Rc and the other part of the pinion Pc is configured to be intermeshed with the parallel gear 7.

If the number of teeth of the parallel gear 7 divided by the number of teeth of the sun gear Sc is set as "m" and the number of teeth of the greater diameter portion or the smaller diameter portion of the pinion Pc intermeshed with the parallel gear 7 divided by the number of teeth of the other part of the pinion Pc intermeshed with the sun gear Sc is set as "n", when the distance between the sun gear Sc and the carrier Cc is set as "1" in the velocity diagram, the parallel gear 7 is disposed at a position left to the carrier Cc so that the distance between the parallel gear 7 and the carrier Cc satisfies n/m, which is different from the position of the ring gear Rc in the velocity diagram. Thereby, the parallel gear 7 rotates at a rotation speed different from the ring gear Rc.

According to the mentioned configuration, by changing the number of teeth of the parallel gear 7, the gear ratio of each gear speed can be set with more freedom. Furthermore, by configuring the parallel gear 7 into a small diameter, it will be more flexible to dispose the other components in the automatic transmission.

However, if the output member 3 is disposed between the second brake B2 and the third brake B3 as described in the fourth embodiment, when the automatic transmission is used in a FR layout vehicle, it is necessary to dispose a counter shaft having a gear intermeshed with the output member 3 and the driving force is transmitted to the rear wheels at both sides through a propeller shaft coupled with the counter shaft. The increment on the number of components such as the counter shaft makes it impossible to miniaturize the automatic transmission.

In this regard, in the automatic transmission of the fifth embodiment as illustrated in FIG. 9, the third brake B3 is coupled to the carrier Cc (the eighth element) of the third planetary gear mechanism 6 at the side of the driving source, and the first brake B1 to the third brake B3 are disposed closer to the driving source than the parallel gear 7, the output member 3 comprised of an output shaft disposed coaxially with the input shaft 2 can be coupled with the parallel gear 7 without being hindered by the third brake B3. Therefore, the output member 3 can be coupled with the propeller shaft without using the counter shaft, which makes it possible to miniaturize the automatic transmission to be used in a FR layout vehicle.

What is claimed is:

1. An automatic transmission which changes rotations of an input shaft into multiple gear speeds transmitted to an output member via a plurality of planetary gear mechanisms disposed in a transmission case, wherein the plurality of planetary gear mechanisms includes three planetary gear mechanisms of a first planetary gear mechanism to a third planetary gear mechanism, the first planetary gear mechanism includes a sun gear, a carrier and a ring gear, the second planetary gear mechanism includes a sun gear, a carrier and a ring gear, the third planetary gear mechanism includes a sun gear, a carrier and a ring gear, the sun gear of the first planetary gear mechanism is coupled with the input shaft, the carrier of the third planetary gear mechanism is coupled with the output member, the ring gear of the first planetary gear mechanism and the carrier of the second planetary gear mechanism are coupled to form a first coupling body, the ring gear of the second planetary gear mechanism and the sun gear of the third planetary gear mechanism are coupled to form a second coupling body, a first engagement mechanism couples the input shaft with the ring gear of the third planetary gear mechanism releasably, a second engagement mechanism couples the carrier of the first planetary gear mechanism with the carrier of the third planetary gear mechanism releasably, a third engagement mechanism couples the carrier of the first planetary gear mechanism with the second coupling body releasably, a fourth engagement mechanism fixes the first coupling body to the transmission case releasably, a fifth engagement mechanism fixes the sun gear of the second planetary gear mechanism to the transmission case releasably, a sixth engagement mechanism fixes ring gear of the third planetary gear mechanism to the transmission case releasably, and the third planetary gear mechanism is of a double-pinion planetary gear mechanism comprised of the sun gear, the ring gear, and the carrier pivotally supporting a pair of pinions, which are intermeshed with each other with either one intermeshed with the sun gear and the other one intermeshed with the ring gear, in such a way that the pair of pinions can rotate and revolve freely.

2. The automatic transmission according to claim 1, wherein the sixth engagement mechanism is a one-way clutch or a two-way clutch.

3. The automatic transmission according to claim 1, wherein the second engagement mechanism is an intermeshing mechanism.

4. The automatic transmission according to claim 1, wherein the third engagement mechanism is disposed at an outer position of the second engagement mechanism in a radial direction thereof and has at least a part overlapped with the second engagement mechanism in an axial direction of the input shaft.

* * * * *